Nov. 22, 1949 — H. FOX ET AL — 2,489,128
CELLULOSE ACETATE PRODUCT AND PROCESS
FOR TREATING CELLULOSE ACETATE
Filed Nov. 24, 1945
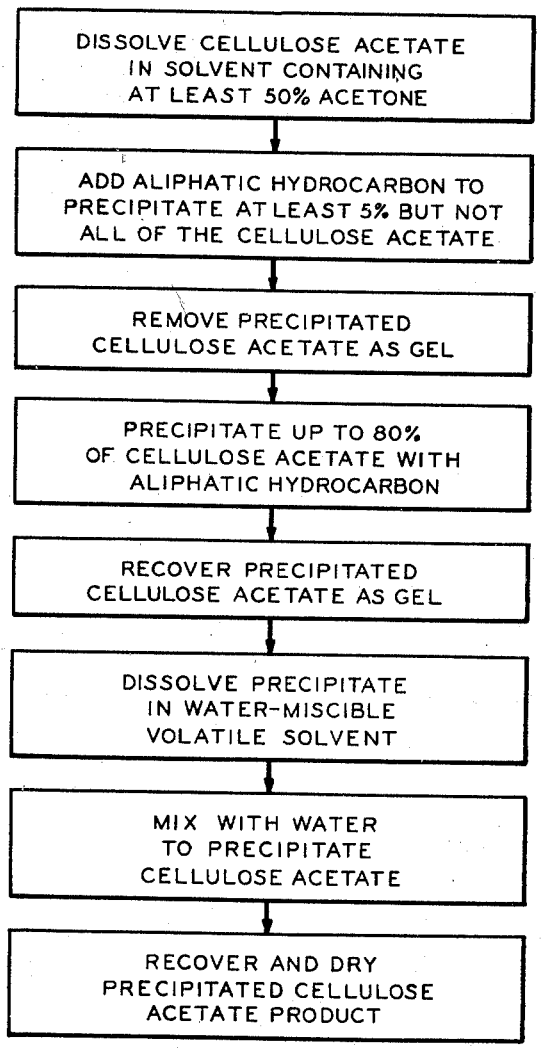
HERMAN FOX
JOSEPH WAYNE KNEISLEY
INVENTOR.
BY Ernest G. Peterson
AGENT Patented Nov. 22, 1949

2,489,128

UNITED STATES PATENT OFFICE 2,489,128

CELLULOSE ACETATE PRODUCT AND PROCESS FOR TREATING CELLULOSE ACETATE

Herman Fox and Joseph Wayne Kneisley, New Brunswick, N. J., assignors to Hercules Powder Company, Wilmington, Del., a corporation of Delaware Application November 24, 1945, Serial No. 630,682

8 Claims. (Cl. 260—230)

This invention relates to a novel derived cellulose acetate productive of substantially colorless plastic compositions of optical clarity and to methods for its production.

There are a variety of applications for substantially colorless, transparent plastic sheeting in the aeronautical and other fields. For example, such sheeting is employed in cockpit canopies, gun turrets, nose sections, windows, etc. Up to the present time, there are only two types of plastics which have met with general acceptance for such purposes, the one type being the acrylate plastics and the other being the cellulose acetate plastics. The acrylic plastics are characterized by having excellent clarity due to the fact that they transmit light freely with substantially no scattering. On the other hand, they have poor impact strength at any temperature but particularly so at low temperatures, such as —25° C. Despite these deficiencies, acrylic plastics are employed because they possess what may be described as "optical clarity."

Cellulose acetate plastics, on the other hand, are employed to some extent in aircraft because of their properties of increased toughness, flexibility, and higher low temperature and normal temperature impact strength, and these are sufficient in some cases to compensate for their lack of "optical clarity." However, so far as is known, no cellulose acetate plastic has heretofore been produced having such light transmission properties and freedom from light-scattering effects as to be characterized as optically clear and, hence, usable where such clarity is demanded. Nor has any known method of improving cellulose acetate, such as by filtration, eliminated the light-scattering characteristic. It will be apparent, of course, that the attainment of optical clarity in a cellulose acetate plastic provides a unique and highly advantageous advance.

It has now been found that, contrary to previous beliefs, a cellulose acetate not having the usual characteristic light-scattering and color properties can be prepared. It has been found that cellulose acetate as prepared is not molecularly entirely homogeneous but consists of several colloidal fractions. It now appears that only certain of these fractions have the effect of imparting color and scattering light.

Now, in accordance with this invention, it has been found that cellulose acetate productive of plastics which are substantially colorless and possess optical clarity results from the employment of a new fractionation process as applied to commercial grade cellulose acetate in flake or other form. Broadly, the entire process involves fractionating cellulose acetate by precipitation with certain coagulants from solutions in a particular solvent to obtain an intermediate fraction in the form of a gel, dispersing the gel with a cellulose acetate solvent to form a solution, precipitating the cellulose acetate using water as the precipitant, and recovering the cellulose acetate fraction so produced. The resulting cellulose acetate may then be worked up with a substantially colorless cellulose acetate plasticizer to form a homogeneous, substantially colorless plastic which transmits light freely and is substantially without the usual light-scattering effect.

The drawing presents a flow sheet of the process according to the invention. The fractionation steps of the process comprise (a) dissolving cellulose acetate in a solvent comprising at least 50% acetone, (b) adding an aliphatic hydrocarbon of from 3 to 7 carbon atoms as a liquid precipitant miscible with the solvent and capable of precipitating the cellulose acetate in gelatinous form, in such an amount as to precipitate at least about 5% of the cellulose acetate originally dissolved but not in an amount to precipitate all or nearly all the cellulose acetate, (c) after this first precipitate has coagulated in the form of a gel, removing it from the solution, (d) adding additional precipitant to the solution in such an amount as to precipitate not more than about 80% of the cellulose acetate originally dissolved while at the same time leaving at least about 2% of the cellulose acetate originally dissolved in solution, and (e) after this second precipitate has coagulated in the form of a gel or gelatinous mass, recovering it from the solution.

Upon recovery of the second precipitate as a gelatinous mass consisting of cellulose acetate, solvent, and precipitant, it is dispersed with the aid of a cellulose acetate solvent to form a solution. This solution is then mixed with water to precipitate the cellulose acetate in a flake form in which, upon drying, it is suitable for preparaton of plastic compositions. The flake is removed from the associated fluids and dried, preferably under vacuum at moderate drying temperatures.

The cellulose actate fraction, or derived cellulose acetate, resulting from the processes described is a novel material productive of substantially colorless cellulose acetate plastic compositions of optical clarity characterized by having the following light transmission properties:

(a) An excitation purity less than 6%
(b) A visual efficiency greater than 82%

These are the properties of plastics prepared from the new cellulose acetates of this invention, said plastics comprising, for example, for test purposes cellulose acetate colloided at a temperature of about 65° C. with dimethyl phthalate in the proportion of 100 parts of cellulose acetate to 45 parts of dimethyl phthalate. The properties are those measured on a ½-inch thick disc of the plastic composition, the disc having been compression molded in a positive mold with stainless steel walls and polished nickel plates for faces under a pressure of 2000 lb./sq. in. and at a temperature of 160° C. for 15 minutes, the method of measurement being that of the International Commission of Illumination of 1931. These plastics are also characterized by an opacity of below 0.70%, as determined using a Pulfrich Nephalometer, using a ½-inch thick disc molded as aforesaid immersed in water in a glass optical cell.

Having indicated in a general way the nature of this invention, the following examples are given as illustrative of the preparation of cellulose acetate productive of substantially colorless cellulose acetate plastics of optical clarity in accordance with this invention.

*Example 1*

A 5% solution of 750 parts of high grade commercial cellulose acetate (3% moisture) in redistilled acetone was prepared by adding the acetate to the solvent with agitation, mixing until a homogeneous solution formed. The cellulose acetate employed had a combined acetic acid content of 53% and a viscosity of 40 seconds as determined by the Hercules falling ball method. With continued agitation, 1000 parts of redistilled n-pentane was added, at which point the solution became cloudy. Four hundred parts of redistilled n-pentane was then added and agitation continued for 15 minutes. The mixture was allowed to stand at 25° C. for 6 hours, at the end of which period a gelatinous precipitate had settled to the bottom of the container, leaving a clear solution of the remaining acetate in the liquor. The clear solution was transferred to another container by means of a siphon. Three thousand parts of n-pentane was then slowly added to the solution with agitation. After a few minutes, a gelatinous precipitate formed and this settled as a fairly stiff gel which was recovered by siphoning off supernatant liquor. Analysis showed that the first gel fraction contained 290 parts of cellulose acetate (40% of the original cellulose acetate). The second gel fraction, representing the desired product, contained 52.5% of the original cellulose acetate, and 7.5% remained dissolved in the solvent liquor.

The second gel fraction so obtained was stirred with an equal part by weight of acetone to provide a solution having a cellulose acetate concentration of about 17.5%. Sufficient water was then slowly added to the solution with accompanying vigorous agitation to precipitate the cellulose acetate. The flake so produced was washed with water until acetone-free and dried at 75° C. under vacuum until the water content was less than 3%. All operations were carried out with pure solvents and in a dust-free atmosphere.

*Example 2*

The process of Example 1 was duplicated, using n-hexane for n-pentane. Analysis of the gel fractions showed that the first fraction contained 40% of the original cellulose acetate, that the second fraction (containing the desired product) contained 54% of the original cellulose acetate, and that 6% remained in the liquor. The two gel fractions thus obtained were very similar in appearance to those correspondingly obtained in Example 1. The second gel fraction was converted to dry flake cellulose acetate in accordance with the method of Example 1.

The following examples are illustrative of the preparation of substantially colorless cellulose acetate plastics from the cellulose acetate fraction prepared in accordance with this invention.

*Examples 3 and 4*

The dried flake cellulose acetate products of Examples 1 and 2 were made up into 15% solutions in redistilled acetone. To these solutions there was added in each instance dimethyl phthalate in the amount of 45% based on the weight of the cellulose acetate. The solutions were agitated until homogeneous and then poured in small amounts into clean, level, flat-bottomed containers and the solvent allowed to evaporate. Films of 25 mils thickness were stripped from the containers and dried at 60° C. for 16 hours. The films were then cut into discs 2 inches in diameter with a stainless steel die, using a cellulose acetate block as the cutting base. Thirty-four grams of thin discs were welded together in a Carver press at 160° C. for 15 minutes at 2000 lb./sq. in. pressure to give a disc ½ inch thick, said press comprising a positive mold with stainless steel walls and polished nickel plates for faces. The resulting disc was given a bright polish by dipping in acetone for a few seconds. In this manner, discs were prepared from the flake cellulose acetate of both Examples 1 and 2. They were found to have the following optical properties as compared with a disc molded and polished in a similar manner but made from a molding powder prepared from the high grade unfractionated cellulose acetate used as the starting material in Examples 1 and 2 and containing dimethyl phthalate as plasticizer in the same amount as was used in making the discs from the fractionated samples:

| | Derived Material From Example 1 | Derived Material From Example 2 | Comparator |
|---|---|---|---|
| Brightness (Visual Efficiency) per cent.. | 84.2 | 84.0 | 78.5 |
| Dominant Wave Length......mmu.. | 573 | 573 | 574 |
| Excitation Purity..........per cent.. | 4.8 | 4.8 | 11.2 |
| Opacity (Pulfrich).............do.... | 0.53 | 0.58 | 1.3 |
| Trichromatic Coefficients: | | | |
| x.................................. | 0.3180 | 0.3185 | 0.3282 |
| y.................................. | 0.3275 | 0.3277 | 0.3399 |
| z.................................. | 0.3545 | 0.3538 | 0.3319 |

A visual comparison of the discs showed that the discs prepared from the fractionated cellulose acetate were colorless and possessed a brilliant transparency or sparkle. Objects viewed through the discs as a lens were precisely defined and not distorted. The comparator disc, on the other hand, had a yellow cast and did not possess this brilliant transparency. The characteristic haze of normally clear cellulose acetate plastic was present. Objects viewed through the disc used as a lens were ill defined.

In accordance with this invention, the cellulose acetate employed in the fractionation process may be in any of the usual forms in which it is available commercially. Thus, it may be in porous flake form, in pulverulent form, or in fibrous form, etc. The cellulose acetate employed is not limited so far as combined acetic acid content is concerned, with the exception that it must be soluble in the acetone-containing solvent employed. Thus, in general, the particular cellulose acetate employed will have a combined acetic acid content of from about 50% to about 59%. Neither is the viscosity of the cellulose acetate employed critical. The usual plastic-type cellulose acetate, however, is preferred; i. e., from about 12 to 120 seconds viscosity, this viscosity characteristic being determined by the time of fall of a $\frac{1}{8}$-inch steel ball through 10 inches of a 20% solution of cellulose acetate in 90 parts acetone : 10 parts ethanol in a 1-inch tube at 25° C.

The solvent employed for the fractionation will be one which dissolves the cellulose acetate employed and which contains as the essential active element, acetone to the extent of at least 50% by weight of the solvent. Thus, acetone, acetone-lower ketone mixtures, acetone-lower aliphatic alcohol mixtures, or acetone mixtures containing lower aliphatic alcohol esters of lower fatty acids such as methyl acetate, ethyl acetate, ethyl formate, etc., may be used. In the case of acetone-lower ketone mixtures, any ketone of 6 carbon atoms and under, such as methyl ethyl ketone, methyl isopropyl ketone, or methyl isobutyl ketone, etc., may be utilized. Where acetone-lower aliphatic alcohols are employed, alcohols of 4 carbon atoms and under, such as methyl, ethyl, propyl, butyl, etc., alcohols may be used. Preferably, the solvents employed will be freed of contaminants prior to use. The concentration of the solution prepared may vary considerably, depending upon the type of cellulose acetate employed and practical considerations, such as the time involved in precipitation. In general, however, a solution containing from about 3% to about 7% cellulose acetate is employed.

Having prepared a suitable cellulose acetate solution as described, an aliphatic hydrocarbon of from 3 to 7 carbon atoms is added to the solution in controlled amount. The amount to be employed will be such as to effect the precipitation of at least about 5% of the cellulose acetate originally dissolved. This constitutes the critical minimum limit of the amount of cellulose acetate to be precipitated initially in order to obtain ultimate plastics substantially colorless and of optical clarity. However, the plastics of optimum clarity result from the precipitation of at least about 15% of the cellulose acetate in this first fraction. However, the hydrocarbon precipitant will be added in an amount less than that which precipitates all or nearly all of the cellulose acetate in solution, since the desired product must remain in solution at this stage. Thus, the hydrocarbon will be added in an amount less than sufficient to bring about precipitatiton of 80% or more of the cellulose acetate present.

It has been found that, although there are a very large number of substances which can precipitate cellulose acetate from acetone solutions, only certain precipitants, for reasons unknown, permit practical recovery of fractions capable of forming optically clear plastics. Thus, such precipitants as water and alcohol are not adapted for the process, possibly because their oxygen-containing groups either affect the acetate precipitated or because the oxygen groups prevent co-action with acetone to give selective fractionation.

The precipitants to be employed in accordance with this invention are the aliphatic hydrocarbons of from 3 to 7 carbon atoms, such as propane, n-butane, isobutane, n-pentane, isopentane, tetramethylmethane, n-hexane, ethyl isobutane, diisopropane, trimethylethylmethane, n-heptane, cyclopentane, cyclohexane, cycloheptane, etc., and mixtures thereof, such as petroleum ether, naphtha, commercial hexane, etc., with n-pentane, n-hexane, and petroleum ether being preferred. It will be understood that the particular precipitant employed must be completely miscible with the cellulose acetate solvent employed or sufficiently miscible to provide homogeneous solutions when the amounts of precipitant required in accordance with this invention are added. Precipitation must be carried out under pressure where propane and the butanes are used to maintain the precipitant in the liquid state, and, while this has some disadvantages, it permits separation of precipitant from the various resulting fractions merely by release of pressure. It will be further apparent that the actual precipitating liquid employed may be one of the precipitants mentioned, diluted partially with the cellulose acetate solvent previously employed.

As illustrated in Example 1, the precipitant or coagulant is preferably added with agitation of the cellulose acetate solution. As the precipitant is added, the solution becomes very cloudy. When agitation is stopped and the mixture allowed to stand, what appears to be a precipitate of opaque solid particles settles and coalesces to form a more or less uniform gel. It generally takes from ½ to 8 hours for this first gel fraction to settle out. The time involved will vary, depending upon the viscosity of the mixture and the amount of the precipitate. After the precipitate has coagulated, it may be recovered by decantation, siphoning, centrifuging, or the like.

A second gel fraction is then precipitated by adding sufficient additional precipitant with agitation of the solution to precipitate a quantity not more than about 80% of the cellulose acetate originally dissolved, preferably not more than about 75%. Care must be taken at this point that too much of the cellulose acetate in the solution is not precipitated. It is essential that only such amounts of cellulose acetate be precipitated as to insure that there remains in solution at least about 2%, and preferably about 5% of the cellulose originally dissolved. As first precipitated, the desired material separates out in suspended flocculent particles. These particles, however, coalesce to form a homogeneous, more or less translucent gel or gelatinous mass. The analysis of this second gel where an acetone-(n-pentane) system is employed will generally fall within the following limits:

|  | Per cent |
|---|---|
| Cellulose acetate | 25 to 45 |
| Acetone | 50 to 70 |
| n-Pentane | 5 to 10 |

The second gel fraction may be recovered in any desired manner as, for example, by siphoning off the mother liquor.

For practical purposes, it is sufficient to separate the cellulose acetate employed as starting material into three fractions; namely, a first fraction which is unsatisfactory for preparing cellulose acetate productive of clear plastics, a second fraction from which plastics of optical colorless clarity are prepared, and a third or residual fraction which remains dissolved after removal of the first two fractions. However, if desired, additional intermediate fractions can be obtained by controlling the amount of precipitant added, and it will be appreciated that any one, or any combination, of the intermediate fractions (after elimination of an initial fraction of at least 5%) will provide cellulose acetate productive of substantially colorless cellulose plastics of optical clarity. The operable and preferred ranges for the separation of the original cellulose acetate into fractions are as follows:

|  | Operable | Preferable |
| --- | --- | --- |
| First Fraction | At least 5% | At least 15%. |
| Second Fraction or Total of Intermediate Fractions. | Not more than 80% | Not more than 75%. |
| Residual Fraction | At least 2% | At least 5%. |

The first fraction can be precipitated in portions, if desired. In such case, the term "first fraction" will be inclusive of portions totaling not less than 5% of the original cellulose acetate, separated prior to precipitation of the desired fraction capable of optically clear product formation, and the term "second fraction" will refer to desired product precipitated after previous removal of at least 5% of the original cellulose acetate.

The second fraction, or other intermediate fraction, in all cases is the desired product capable of forming optically clear and colorless cellulose acetate articles. The first gel fraction yields cellulose acetate suitable only where clarity is not required. The residual fraction remaining in solution can be recovered by precipitation therefrom or evaporation for use where poor color and lowered stability are acceptable.

As illustrated by the examples, once the desired gel fraction (containing the derived cellulose acetate fraction, acetone, and hydrocarbon) has been obtained, it is dissolved in a water-miscible volatile solvent to form a homogeneous solution having above 3% but not more than about 25% total solids content. It is preferred that the concentration of this solution be between about 15% and about 20%. It is convenient to use the same solvent in this step as was used to dissolve the original cellulose acetate; however, the use of the same solvent is not required. It is satisfactory if the solvent has sufficient solvent power for the cellulose acetate to provide a homogeneous solution thereof and at the same time is water-miscible. Thus, the numerous solvents mentioned hereinabove may be employed at this step in the process.

The preferred method of precipitation of the cellulose acetate from the solution has been illustrated in Examples 1 and 2. In this preferred modification, the cellulose acetate solution is vigorously agitated and water is added slowly until the desired water concentration is reached and precipitation is complete. The amount of water employed will, in any instance, be at least sufficient to precipitate the cellulose acetate. It is sometimes desirable to employ an amount of water little more than that required to precipitate the cellulose acetate, for example, an amount to lead to a final mixture of about 65% water (disregarding the cellulose acetate content). Controlling the amount of water used affords economy in the recovery of solvent and, at the same time, provides a precipitated cellulose acetate having a uniform particle size. It has been found that, although water cannot coact with acetone to give a fraction like that obtained by the use of hydrocarbons and although water has some tendency to increase the light-scattering tendency in cellulose acetate, it can be used in the present process to precipitate the derived cellulose acetate fraction from its solution in active solvent and residual hydrocarbon.

As modifications of the preferred precipitation step just referred to, the cellulose acetate solution may be added to water with agitation thereof. Also, the cellulose acetate solution and the water may be added simultaneously to a precipitator with accompanying agitation. In all the above modifications, in place of water alone an aqueous solution of cellulose acetate solvent of such concentration as to give the desired final concentration may be employed.

After the cellulose acetate has been recovered in flake, granular, or other form, it is dried. It is desirable to avoid the use of too high a temperature in this step, and, generally speaking, it is preferred to dry the product under vacuum at a temperature of from 50° C. to about 90° C. The dried product will desirably contain less than 3% water.

Cellulose acetates prepared in accordance with this invention may be made up into substantially colorless cellulose acetate plastics possessing optical clarity by any of the processes customarily employed in the art to effect the colloidization of cellulose acetate. In the colloidization, a substantially colorless cellulose acetate plasticizer will be employed and, to effect colloidization, either the solvent or nonsolvent process may be used. Thus, in the solvent process, the dried cellulose acetate in flake or other form is mixed with plasticizer and a volatile cellulose acetate solvent to form a paste of a consistency suitable for rolling on a roll mill. The temperature of the rolls during this operation will desirably be between 55° C. and 65° C., and the operation will be continued until the cellulose acetate is substantially completely colloided. The colloided cellulose acetate may be taken off the rolls in the form of a sheet which can be broken up into particles of molding powder or extruded in any desired shape. Alternatively, sheets from the roll mill may be welded together to form a block of substantially greater thickness than that of a single sheet in a press at, for example, from about 100 to about 600 lb./sq. in. pressure and at from 50° C. to 120° C. Sheets of any desired thickness may be cut from the resulting block.

If it is desired to avoid the use of a volatile solvent, a mixture of the cellulose acetate and desired substantially colorless plasticizer may be subjected to pressure-mixing in, for example, a Banbury mixer. The resulting colloided cellulose acetate may be broken up into molding powder, extruded to desired shapes, etc. Preferably, a temperature in the range of from about 70° C. to about 100° C. is employed during mixing, it being particularly necessary to avoid the use of such a high temperature as to introduce undesirable color during this step.

In colloiding the cellulose acetate, the amount of plasticizer to employ will depend upon the physical and other characteristics desired in the resulting plastic. Usually, from about 5% to about 40% plasticizer will be employed, based on the total nonvolatile ingredients. As exemplary of the substantially colorless plasticizers which may be employed, dimethyl phthalate, diethyl phthalate, dimethoxyethyl phthalate, methyl phthalyl ethyl glycolate, ethyl phthalyl ethyl glycolate, p-toluene sulfonamid, tributyl phosphate, dibutyl tartrate, diamyl tartrate, triacetin, tripropionin, diethylene glycol dipropionate, and combinations thereof may be employed. It is preferred that the plasticizer used have a high refractive index; i. e., at least about 1.43.

The derived cellulose acetates or fractions resulting from the practice of the processes described herein are unique in that they are productive of substantially colorless plastics of optical clarity and having certain definite light transmission properties. Thus, these cellulose acetates, when colloided at a temperature of about 65° C. with dimethyl pthalate in the proportion of 100 parts of cellulose acetate to 45 parts of dimethyl phthalate, are productive of plastics having an excitation purity less than 6% and a visual efficiency greater than 82%. Generally, the excitation purity of the plastics has been found to fall within the range of 6% and 3% and the visual efficiency thereof within the range of 82% and 88%. These measurements are on the basis of a ½-inch thick plastic disc, which disc has been compression molded in a positive mold with stainless steel walls and polished nickel plates for faces under a pressure of 2000 lb./sq. in. and at a temperature of 160° C. for 15 minutes. The plastics are additionally characterized by an opacity of below 0.70%, as determined by the use of a Pulfrich Nephalometer, using a ½-inch thick plastic disc molded as aforesaid, immersed in water in a glass optical cell.

The light transmission characteristics of the plastics resulting from the application of the methods described herein were determined by obtaining a spectral transmission curve of discs prepared by the standard procedure described above, under illumination at normal incidence on a spectrophotometer, and then analyzing the curve so obtained by using the normal color mixture data for the standard observer and the spectral energy distribution of illuminant C, as defined in 1931 by the International Commission on Illumination, hereinafter referred to as I. C. I.

The method as set up by the I. C. I. is based upon the fact that any color can be matched by the additive mixture of three arbitrarily chosen primary colors. The amounts of the three primaries required to match the sample color are known as the X, Y, and Z tristimulus values. Three other quantities, $x$, $y$, and $z$, known as trichromatic coefficients, are defined as follows:

$$x = \frac{X}{X+Y+Z} \quad y = \frac{Y}{X+Y+Z} \quad z = \frac{Z}{X+Y+Z}$$

Since the sum of the three trichromatic coefficients is equal to 1, it follows that any two of these coefficients define a given color, the third being merely the difference between 1 and the sum of the other two.

The trichromatic coefficients of a disc may be readily calculated from the spectrophotometer transmission curve given by the disc. While the $x$ and $y$ trichromatic coefficients, for example, define the results of a color measurement for the purpose of color tolerance specification, it is more convenient to express these in terms of a dominant wave length and excitation purity. These two attributes of color; that is, dominant wave length and excitation purity, are merely a polar coordinate form of the $x$ and $y$ trichromatic coefficients and uniquely define colors of the same brightnesses. Having determined the $x$ and $y$ trichromatic coefficients of a cellulose acetate disc, the dominant wave length and excitation purity of the disc may be determined by plotting the $y$ value as ordinate and the $x$ value as abscissa on a two-dimensional diagram. When this point is connected by a straight line passing through the point represented by illuminant C (a standard illuminant defined by the I. C. I. and which approximates average normal daylight) the line will intersect the locus of points representing the pure spectrum colors at a point whose wave length is known as the dominant wave length of the sample. The ratio of the distance between illuminant point and sample point to the total distance between illuminant point and spectrum locus, expressed in per cent, is known as the excitation purity.

A third attribute of color of a sample is the brightness, or, more accurately, the visual efficiency. It is measured by the Y tristimulus value. The visual efficiency of any given sample may be computed by determining the Y value for a surface having a reflection factor of 1.000 at all wave lengths. The ratio of the Y value of the sample to the Y value of this perfect reflector is the visual efficiency of the sample. In other words, it is the brightness of the sample relative to the brightness of a perfect reflector under the same illumination—in the present case, illuminant C.

Charts for facilitating the conversion of the trichromatic coefficients into dominant wave length and excitation purity and manner of determining brightness, as well as complete exposition of the method set up by the I. C. I., may be found in the Handbook of Colorimetry, the Technology Press, Massachusetts Institute of Technology, Cambridge, Massachusetts, 1936, prepared under the direction of Arthur C. Hardy.

The Pulfrich opacity values of the plastics of this invention were determined by use of the Pulfrich Nephalometer, using a ½-inch thick disc immersed in a glass optical cell. The operation of this device is described in Laboratory Apparatus and Reagents (1931), A. H. Thomas Co., pages 613–619.

The derived cellulose acetate products of this invention are productive of plastics of particular utility in the aeronautical industry. A manufacturer may now equip his planes with plastics which have, at the same time, optimum clarity and high impact strength at normal and very low temperatures. As a specific example, plastics can be prepared from the cellulose acetates of this invention to meet the optical requirements of grade A of the "Navy Aeronautical Specification" P-41c, as amended February 22, 1943, for plastic, transparent, flame-resisting sheet. Heretofore, cellulose acetate plastics have not had the clarity required to meet this specification. The superiority of these plastics for other applications in the aeronautical field, as for instrument dials and crystals, navigating instruments, insulation, structural parts, etc., is obvious.

The major advantage accruing with the use of the derived cellulose acetates of this invention lies in the attainment of crystal colorlessness and clarity in plastics prepared therefrom. Such plastics are substantially free from color, as is apparent from their light transmission characteristics. The attainment of crystal or optical clarity in a plastic which has, at the same time, high impact strength at normal and subnormal temperatures constitutes an advance which is of far-reaching significance.

It also has been found that plastics based on the derived cellulose acetate fraction obtained in accordance with this invention have a materially higher impact strength than do plastics made from the original cellulose acetate used as the raw material. Apparently, the colloidal fractions which impart color and are responsible for scattering of light have an undesirable effect on impact strength.

Wherever in the specification and claims a solution is mentioned, the term is to be considered of sufficient breadth to include a homogeneous mixture, which technically may be only a dispersion, as well as true solutions.

All parts and percentage figures in this specification and appended claims are by weight unless otherwise indicated.

What we claim and desire to protect by Letters Patent is:

1. A fractionation process for the preparation of a derived cellulose acetate flake productive of substantially colorless plastics of optical clarity which comprises dissolving cellulose acetate in a solvent comprising at least 50% acetone; adding an aliphatic hydrocarbon of from 3 to 7 carbon atoms, miscible with said solvent and capable of precipitating the cellulose acetate in gelatinous form, in such an amount as to precipitate at least about 5% but not all of the cellulose acetate originally dissolved; removing the resulting precipitate from the solution; adding additional hydrocarbon precipitant to the solution in such an amount as to precipitate not more than about 80% of the cellulose acetate originally dissolved while at the same time leaving at least about 2% of the cellulose acetate originally dissolved in the solution; recovering the resulting precipitate from the solution; dissolving the recovered second-mentioned precipitate in a water-miscible volatile cellulose acetate solvent in an amount to form a homogeneous solution having not more than 25% total solids content; mixing the resulting solution with sufficient water to precipitate the derived cellulose acetate fraction therein; and recovering and drying the resulting precipitated flake cellulose acetate.

2. A fractionation process for the preparation of a derived cellulose acetate flake productive of substantially colorless plastics of optical clarity which comprises dissolving cellulose acetate in a solvent comprising at least 50% acetone; adding an aliphatic hydrocarbon of from 3 to 7 carbon atoms, miscible with said solvent and capable of precipitating the cellulose acetate in gelatinous form, in such an amount as to precipitate at least about 15% but not all of the cellulose acetate originally dissolved; removing the resulting precipitate from the solution; adding additional hydrocarbon precipitant to the solution in such an amount as to precipitate not more than about 75% of the cellulose acetate originally dissolved while at the same time leaving at least about 5% of the cellulose acetate originally dissolved in solution; recovering the resulting precipitate from the solution; dissolving the recovered second-mentioned precipitate in a water-miscible volatile cellulose acetate solvent in an amount to form a homogeneous solution having not more than 25% total solids content; mixing the resulting solution with sufficient water to precipitate the derived cellulose acetate fraction contained therein; and recovering and drying the resulting precipitated flake cellulose acetate.

3. A fractionation process for the preparation of a derived cellulose acetate flake productive of substantially colorless plastics of optical clarity which comprises dissolving cellulose acetate in a solvent comprising at least 50% acetone; adding an aliphatic hydrocarbon of from 3 to 7 carbon atoms, miscible with said solvent and capable of precipitating the cellulose acetate in gelatinous form, in such an amount as to precipitate at least about 5% but not all of the cellulose acetate originally dissolved; allowing the resulting precipitate to coagulate and settle for a period of from about ½ to about 8 hours and separating it from the solution; adding additional hydrocarbon precipitant to the solution in such an amount as to precipitate not more than about 80% of the cellulose acetate originally dissolved while at the same time leaving at least about 2% of the cellulose acetate originally dissolved in solution; recovering the resulting precipitate from the solution; dissolving the recovered second-mentioned precipitate in a water-miscible volatile cellulose acetate solvent in an amount to form a homogeneous solution having not more than 25% total solids content; adding to said solution with accompanying agitation sufficient water to precipitate the cellulose acetate; and recovering and drying the resulting precipitated flake cellulose acetate.

4. A fractionation process for the preparation of a derived cellulose acetate flake productive of substantially colorless plastics of optical clarity which comprises dissolving cellulose acetate in a solvent comprising at least 50% acetone; adding pentane in such an amount as to precipitate at least about 5% but not all of the cellulose acetate originally dissolved; removing the resulting precipitate from the solution; adding additional pentane to the solution in such an amount as to precipitate not more than about 80% of the cellulose acetate originally dissolved while at the same time leaving at least about 2% of the cellulose acetate originally dissolved in solution; recovering the resulting precipitate from the solution; dissolving the recovered second-mentioned precipitate in a water-miscible volatile cellulose acetate solvent in an amount to form a homogeneous solution having not more than 25% total solids content, mixing the resulting solution with sufficient water to precipitate the cellulose acetate fraction contained therein; and recovering and drying the precipitated flake cellulose acetate.

5. A fractionation process for the preparation of a derived cellulose acetate flake productive of substantially colorless plastics of optical clarity which comprises dissolving cellulose acetate in a solvent comprising at least 50% acetone; adding hexane in such an amount as to precipitate at least about 5% but not all of the cellulose acetate originally dissolved; removing the resulting precipitate from the solution; adding additional hexane to the solution in such an amount as to precipitate not more than about 80% of the cellulose acetate originally dissolved while at the same time leaving at least about 2% of the cellulose acetate originally dissolved in solution; recovering the resulting precipitate from the solution; dissolving the recovered second-mentioned precipitate in a water-miscible volatile cellulose acetate solvent in an amount to form a homogeneous solution having not more than 25% total solids content; mixing the resulting solution with sufficient water to precipitate the cellulose acetate fraction contained therein; and recovering and drying the precipitated flake cellulose acetate.

6. A fractionation process for the preparation of a derived cellulose acetate flake productive of substantially colorless plastics of optical clarity which comprises dissolving cellulose acetate in a solvent comprising methyl ethyl ketone and at least 50% acetone; adding an aliphatic hydrocarbon of from 3 to 7 carbon atoms, miscible with said solvent and capable of precipitating the cellulose acetate in gelatinous form, in such an amount as to precipitate at least about 5% but not all of the cellulose acetate originally dissolved; removing the resulting precipitate from the solution; adding additional hydrocarbon precipitant to the solution in such an amount as to precipitate not more than about 80% of the cellulose acetate originally dissolved while at the same time leaving at least about 2% of the cellulose acetate originally dissolved in the solution; recovering the resulting precipitate from the solution; dissolving the recovered second-mentioned precipitate in a water-miscible volatile cellulose acetate solvent in an amount to form a homogeneous solution having not more than 25% total solids content; mixing the resulting solution with sufficient water to precipitate the derived cellulose acetate fraction therein; and recovering and drying the resulting precipitated flake cellulose acetate.

7. A fractionation process for the preparation of a derived cellulose acetate flake productive of substantially colorless plastics of optical clarity which comprises dissolving cellulose acetate in acetone; adding an aliphatic hydrocarbon of from 3 to 7 carbon atoms, miscible with said solvent and capable of precipitating the cellulose acetate in gelatinous form, in such an amount as to precipitate at least about 5% but not all of the cellulose acetate originally dissolved; removing the resulting precipitate from the solution; adding additional hydrocarbon precipitant to the solution in such an amount as to precipitate not more than about 80% of the cellulose acetate originally dissolved while at the same time leaving at least about 2% of the cellulose acetate originally dissolved in the solution; recovering the resulting precipitate from the solution; dissolving the recovered second-mentioned precipitate in a water-miscible volatile cellulose acetate solvent in an amount to form a homogeneous solution having not more than 25% total solids content; mixing the resulting solution with sufficient water to precipitate the derived cellulose acetate fraction therein; and recovering and drying the resulting precipitated flake cellulose acetate.

8. As a new product, a derived cellulose acetate flake substantially freed of color-imparting and light-scattering variations thereof, said derived cellulose acetate flake being substantially identical with the product obtained by dissolving cellulose acetate in a solvent comprising at least 50% acetone; adding an aliphatic hydrocarbon of from 3 to 7 carbon atoms, miscible with said solvent and capable of precipitating the cellulose acetate in gelatinous form, in such an amount as to precipitate at least about 5% but not all of the cellulose acetate originally dissolved; removing the resulting precipitate from the solution; adding additional hydrocarbon precipitant to the solution in such an amount as to precipitate not more than about 80% of the cellulose acetate originally dissolved while at the same time leaving at least about 2% of the cellulose acetate originally dissolved in the solution; recovering the resulting precipitate from the solution; dissolving the recovered second-mentioned precipitate in a water-miscible volatile cellulose acetate solvent in an amount to form a homogeneous solution having not more than 25% total solids content; mixing the resulting solution with sufficient water to precipitate the derived cellulose acetate fraction therein; and recovering and drying the resulting precipitated flake cellulose acetate.

HERMAN FOX.
JOSEPH WAYNE KNEISLEY.

REFERENCES CITED

The following references are of record in the file of this patent:

FOREIGN PATENTS

| Number | Country | Date |
| --- | --- | --- |
| 741,220 | France | Dec. 2, 1932 |

OTHER REFERENCES

Kunstseide, vol. 12, pages 468 to 472 (1930), 5 pages.

Herzog et al.: Cellulosechemie, vol. 13, pages 25 to 31 (1932), 7 pages.

Spurlin: Ind. Eng. Chem., vol. 30, pages 538 to 542, 5 pages (1938).